April 1, 1958   P. P. NEWCOMB   2,828,940
COOLED TURBINE BLADE
Filed Dec. 30, 1953
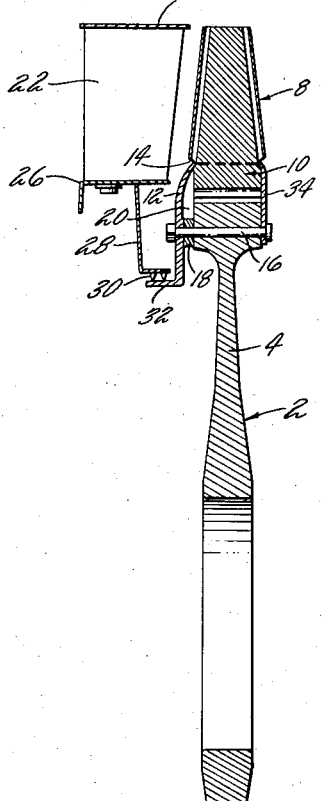
FIG. 1
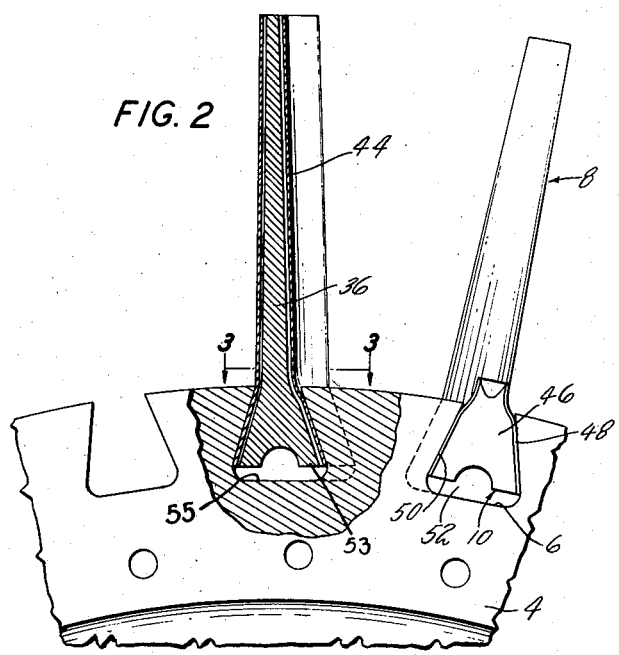
FIG. 2
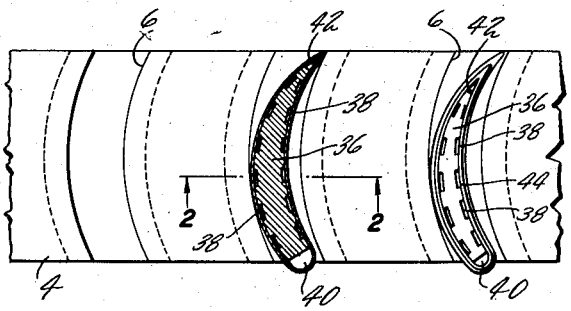
FIG. 3
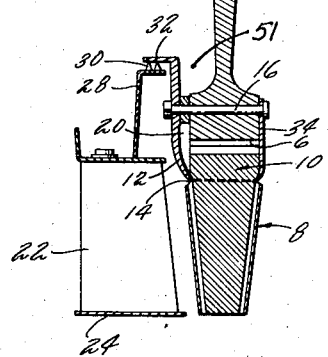
INVENTOR
PHILIP P. NEWCOMB
BY Charles A Warren
ATTORNEY

United States Patent Office 2,828,940
Patented Apr. 1, 1958

2,828,940

COOLED TURBINE BLADE

Philip P. Newcomb, Manchester, Conn., assignor to United Aircraft Corporation, East Hartford, Conn., a corporation of Delaware Application December 30, 1953, Serial No. 401,204

7 Claims. (Cl. 253—39.15)

This invention relates to a rotor construction for a turbine and particularly to an arrangement for supporting and cooling the blades extending outwardly from the periphery of the hub of the rotor.

One feature of the invention is an arrangement by which to supply cooling air to the blade adjacent the root so that cooling air may flow through the entire length of the blade for the purpose of cooling it. Another feature is an arrangement of a hollow blade to provide for the circulation of cooling air through the entire length of the blade and adjacent to the surface of the blade to effect adequate cooling.

One feature of the invention is an arrangement of a hollow blade having a central supporting spar so constructed as to provide for damping of vibrations when the rotor is in operation.

Other objects and advantages will be apparent from the specification and claims, and from the accompanying drawings which illustrate an embodiment of the invention.

Fig. 1 is a longitudinal sectional view through a turbine disc showing its arrangement with relation to the turbine nozzle.

Fig. 2 is a fragmental elevation of the disc of Fig. 1 with parts broken away.

Fig. 3 is a developed view looking radially inward toward the axis of the disc with one blade cut away along the line 3—3 of Fig. 2.

With reference first to Fig. 1, the rotor disc 2 is in the form of a hub 4 having slots 6 adjacent to the peripheries to receive blades 8, the latter having roots 10 which fit within the slots 6. On the upstream side of the disc is mounted a ring 12 which at its outer edge is in contact with the periphery of the disc at 14 and with one axial end of each blade adjacent to the root and which adjacent the fastening means 16 is spaced from the disc, as by washers 18, to provide for a flow of cooling air from the upstream side of the disc into the annular chamber 20 located between the ring 12 and the blade roots.

Directly upstream of the blades 8 is positioned, during operation of the turbine, a row of nozzle vanes 22 supported by an outer shroud 24 and an inner shroud 26. The inner shroud carries an inwardly extending diaphragm 28 having a seal 30 at its inner periphery. The ring 12 has a radially projecting flange 32 on its inner periphery which engages with the seal 30 and prevents the leakage of cooling air from the space radially inward of the flange 32.

On the downstream side of the turbine disc is mounted a substantially flat plate 34 which overlies the side of the disc adjacent its periphery and also overlies the ends of the blade roots to prevent axial movement of the blades toward the right, Fig. 1, with respect to the hub. This plate 34 may be held in position by the same fastening means or bolts 16 which hold the ring 12 in position.

It will be apparent that the outer edge of the ring 12 engages the roots of the blades substantially in line with the periphery of the disc, as shown in Fig. 1, and prevents axial movement of the blades toward the left as seen in Fig. 1.

With reference to Figs. 2 and 3 the blade roots 10 are dovetail in shape and fit within the corresponding dovetail grooves 6 in the periphery of the hub. These slots may, as shown in Fig. 3, be arcuate from end to end of the slot and are so arranged that the blade is inserted by positioning the root at one end of the slot and inserting it into the slot by a generally axial movement. In the arrangement shown the side walls of the slot are substantially parallel to the chord of the blade since this contour increases the strength of the blade and its resistance to tipping circumferentially under the pressure loading thereon.

Each blade consists of a central spar 36 which is generally airfoil shape in cross section and which has grooves 38 extending from the lowermost portion of the root to the tip of the spar as best shown in Figs. 2 and 3. This spar may also have its leading and trailing edges cut away to provide openings 40 and 42 between the spar and the surrounding sheet metal airfoil blade shape 44 which surrounds the spar 36 and corresponds substantially in shape thereto. The grooves 38, when the blade shape 44 has been positioned over the spar, define air passages for the flow of air radially between the spar and the blade shape.

The spar 36 has a dovetailed root section 46 which is narrower than the width of the slot to accommodate the securing flaps 48 and 50, which are integral with the blade shape 44 and extend into the slot 6 between the root portion of the spar and the opposite side walls of the slot, these flaps terminating substantially at the lower surface of the root section 46. With this arrangement it will be apparent that radial movement of the blade outwardly of the hub is prevented by the shape of the slot and the shape of the blade root. Since the surrounding blade shape 44 is not positively secured to the spar any vibration of the blade will cause frictional sliding movement between the spar and the blade shape which will effectively damp the vibrations. The flaps 48 and 50 terminate laterally at or inside of the outer side walls of the disc so as not to project beyond the side walls, as shown in Figs. 1 and 2 such that the two flaps on opposite sides of the root section 46 are independent of each other.

Cooling air for the purpose of cooling the blade is admitted to the space 51 which is radially inward of the flange 32 and is on the upstream side of the rotor hub. This air may be obtained from the compressor part of the gas turbine power plant in which the turbine disc is positioned or it may be obtained from any other suitable source of air under pressure. The air under pressure from this space 51 enters the chamber 20 past the washers 18 and thence into the space 52 beneath the root 46 being guided into this space by ring 12. The ring 12 contacts the disc adjacent to its periphery and also contacts the axial end of the several spars, since as shown clearly in Figs. 1 and 2, the leading edge of the blade shape 44 is cut away adjacent to the periphery of the disc to expose the axial end of the spar at and slightly above the junction of the root section with the remainder of the spar. Air within the space 52 flows into the grooves or passages 38 and flows radially outward along the inner surface of the blade shape to be discharged at the outer end of the blade. The blades as shown have the bottom or base surface 53 of the root spaced from the bottom or base surface 55 of the slot to define the space 52. The blades are in the position shown at least when the disc is rotating such that the blades are held outwardly by centrifugal force. It will be understood that plate 34 closes the downstream end of space 52.

It is to be understood that the invention is not limited to the specific embodiment herein illustrated and described, but may be used in other ways without departure from its spirit as defined by the following claims.

I claim:

1. In a rotor construction, a disc having axially extending slots in the periphery, the opposite walls of each slot converging toward each other in a direction radially outward from the axis of the disc, a spar for each slot, each spar having a blade portion and a root portion located at the inner end of the blade portion, the root portion fitting within the slot and having its opposite walls converging toward each other in a direction radially outward from the axis of the disc and at substantially the same angle as the walls of the slot, and a thin sheet metal blade shape surrounding said spar and having a root portion projecting into the slot and held between the side surfaces of the root on the spar and the side walls of the slot, the base surface of the root of the spar being spaced from the base of the slot, at least during rotation of the rotor on its axis such that each spar and blade shape are urged radially outward by centrifugal force in the associated slot, to provide an air passage extending transversely of the disc and located between the base of the slot and the base surface of the spar root portion, and radial passages in the surface of the spar extending from the base surface thereof for the flow of air from said air passage.

2. In a rotor construction, a disc having axially extending slots in the periphery, the opposite walls of each slot converging toward each other in a direction radially outward from the axis of the disc, a spar for each slot, each spar having a blade portion and a root portion located at the inner end of the blade portion, the root portion fitting within the slot and having its opposite walls converging toward each other in a direction radially outward from the axis of the disc and at substantially the same angle as the walls of the slot, and a thin sheet metal blade shape surrounding said spar and having a root portion projecting into the slot and held between the side surfaces of the root on the spar and the side walls of the slot, the base surface of the root of the spar being spaced from the base of the slot, at least during rotation of the rotor on its axis such that each spar and blade shape are urged radially outward by centrifugal force in the associated slot, to provide an air passage extending transversely of the disc and located between the base of the slot and the base surface of the spar root portion, radial passages in the surface of the spar for the flow of air from said air passage, said radial passages extending the entire length of the spar from the base surface thereof for the escape of cooling air at the outer end of the blade shape.

3. In a rotor construction, a disc having axially extending slots in the periphery, the opposite walls of each slot converging toward each other in a direction radially outward from the axis of the disc, a spar for each slot, each spar having a blade portion and a root portion located at the inner end of the blade portion, the root portion fitting within the slot and having its opposite walls converging toward each other in a direction radially outward from the axis of the disc and at substantially the same angle as the walls of the slot, and a thin sheet metal blade shape surrounding said spar and having a root portion projecting into the slot and held between the side surfaces of the root on the spar and the side walls of the slot, the base surface of the root of the spar being spaced from the base of the slot, at least during rotation of the rotor on its axis such that each spar and blade shape are urged radially outward by centrifugal force in the associated slot, to provide an air passage extending transversely of the disc and located between the base of the slot and the base surface of the spar root portion, radial passages in the surface of the spar extending from the base surface thereof for the flow of air from said air passage, and a ring mounted on one side of the disc with its outer edge engaging the disc adjacent to its periphery and one axial end of each of the spars adjacent its root, said ring inwardly of its outer edge being spaced from the disc to define an annular space for guiding cooling air into said air passage.

4. In a rotor construction, a disc having axially extending slots in the periphery, the opposite walls of each slot converging toward each other in a direction radially outward from the axis of the disc, a spar for each slot, each spar having a blade portion and a root portion located at the inner end of the blade portion, the root portion fitting within the slot and having its opposite walls converging toward each other in a direction radially outward from the axis of the disc and at substantially the same angle as the walls of the slot, and a thin sheet metal blade shape surrounding said spar and having a root portion projecting into the slot and held between the side surfaces of the root on the spar and the side walls of the slot, the base surface of the root of the spar being spaced from the base of the slot, at least during rotation of the rotor on its axis such that each spar and blade shape are urged radially outward by centrifugal force in the associated slot, to provide an air passage extending transversely of the disc and located between the base of the slot and the base surface of the spar root portion, radial passages in the surface of the spar extending from the base surface thereof for the flow of air from said air passage, said radial passages extending the entire length of the spar for the escape of cooling air at the outer end of the blade shape, the outer end of said blade shape being open, and a ring mounted on one side of the disc with its outer edge engaging the disc adjacent to its periphery and one axial end of each of the spars adjacent its root, said ring inwardly of its outer edge being spaced from the disc to define an annular space adjacent the periphery for guiding cooling air into said air passage.

5. In a rotor construction, a disc having axially extending slots in the periphery, the opposite walls of each slot converging toward each other in a direction radially outward from the axis of the disc, a spar for each slot, each spar having a blade portion and a root portion located at the inner end of the blade portion, the root portion fitting within the slot, and a thin sheet metal blade shape surrounding said spar and having a root portion projecting into the slot and held between the side surfaces of the root on the spar and the side walls of the slot, the base surface of the root of the spar being spaced from the base of the slot, at least during rotation of the rotor on its axis such that each spar and blade shape are urged radially outward by centrifugal force in the associated slot, to provide an air passage extending transversely of the disc and located between the base of the slot and the base surface of the spar root portion, radial passages in the surface of the spar extending from the base surface thereof for the flow of air from said air passage, and a ring secured to one side of the disc adjacent the periphery, said ring being spaced from the disc except at its outer edge which extends toward and engages one end of each of the spars and also engages the disc substantially at the periphery thereof and radially outward of said air passage.

6. In a rotor construction, a disc having axially extending slots in the periphery, the opposite walls of each slot converging toward each other in a direction radially outward from the axis of the disc, a spar for each slot, each spar having a blade portion and a root portion located at the inner end of the blade portion, the root portion fitting within the slot, and a thin sheet metal blade shape surrounding said spar and having a root portion projecting into the slot and held between the side surfaces of the root on the spar and the side walls of the slot, the base surface of the root of the spar being spaced from the base of the slot, at least during rotation of the rotor on its axis such that each spar and blade shape are urged radially outward by centrifugal force in the associated slot, to provide an air passage extending transversely of the disc and located between the base of the slot and the base surface of the spar root portion, radial passages in the surface of the spar extending from the base surface thereof for the flow of air from said air passage, said radial passages extending the entire length of the spar for the escape of cooling air at the outer end of the blade shape, the outer end of said blade shape being open, and a ring secured to one side of the disc adjacent the periphery, said ring being spaced from the disc except at its outer edge which extends toward and engages one end of each of the spars and also engages the disc substantially at the periphery thereof and radially outward of said air passage.

7. In a rotor construction, a disc having axially extending slots in the periphery, the opposite walls of each slot converging toward each other in a direction radially outward from the axis of the disc, a spar for each slot, each spar having a blade portion and a root portion located at the inner end of the blade portion, the root portion fitting within the slot, and a thin sheet metal blade shape surrounding said spar and having a root portion projecting into the slot and held between the side surfaces of the root on the spar and the side walls of the slot, said root portion of the blade shape terminating substantially at the lower surface of the root portion of the spar, the base surface of the root of the spar being spaced from the base of the slot, at least during rotation of the rotor on its axis such that each spar and blade shape are urged radially outward by centrifugal force in the associated slot, to provide an air passage extending transversely of the disc and located between the base of the slot and the base surface of the spar root portion, radial passages in the surface of the spar extending from the base surface thereof for the flow of air from said air passage, and a ring mounted on one side of the disc for guiding cooling air into said air passage, said ring being spaced from the disc except at its outer edge which extends toward and engages one end of each of the spar roots to prevent axial movement of the spars with respect to the disc, said ring also engaging the disc adjacent to the periphery, and another ring member on the opposite side of the disc to prevent axial movement of the spar roots out of the disc on said opposite side.

References Cited in the file of this patent

UNITED STATES PATENTS

| | | |
|---|---|---|
| 2,483,610 | Baumann | Oct. 4, 1949 |
| 2,559,131 | Oestrich et al. | July 3, 1951 |
| 2,568,726 | Franz | Sept. 25, 1951 |
| 2,642,263 | Thorp | June 16, 1953 |
| 2,647,368 | Triebbnigg | Aug. 4, 1953 |
| 2,650,803 | Rosskopf | Sept. 1, 1953 |

FOREIGN PATENTS

| | | |
|---|---|---|
| 550,328 | Germany | May 11, 1932 |
| 672,457 | Great Britain | May 21, 1952 |
| 1,007,303 | France | Feb. 6, 1952 |